United States Patent [19]

Patel et al.

[11] Patent Number: 5,033,499
[45] Date of Patent: Jul. 23, 1991

[54] PRESSURE REDUCING VALVE

[76] Inventors: Milan N. Patel, 10 Norton Ave., Surbiton, Surrey KT5 9DY; Hubert J. T. Clements, 32 Canford Avenue, Northolt, Middlesex, both of United Kingdom

[21] Appl. No.: 510,322

[22] Filed: Apr. 16, 1990

[30] Foreign Application Priority Data

Apr. 28, 1989 [GB] United Kingdom ............... 8909904

[51] Int. Cl.⁵ ............................................ G05D 16/10
[52] U.S. Cl. ............................. 137/269; 137/505.13; 137/495
[58] Field of Search ..................... 137/505.13, 505.25, 137/269, 495

[56] References Cited

U.S. PATENT DOCUMENTS 3,211,175 10/1965 Replogle .
3,946,756 3/1976 Specht ............................ 137/495
4,020,863 3/1977 Fabish .......................... 137/505.25 X
4,226,257 10/1980 Trinkwalder ............... 137/505.25 X
4,844,111 7/1989 Pritchard ................... 137/505.25 X

FOREIGN PATENT DOCUMENTS 3222247 12/1983 Fed. Rep. of Germany .
46155 3/1966 German Democratic Rep. .
103281 3/1923 Switzerland .

Primary Examiner—Alan Cohan
Attorney, Agent, or Firm—James C. Simmons; William F. Marsh

[57] ABSTRACT

A pressure reducing valve (1) is mounted directly on a high pressure (300 bar) gas cylinder (23). When a standard adaptor is inserted in the outlet (4) and handwheel (20) is opened gas is available at outlet (4) at a maximum pressure of 200 bar. When a special filling adaptor (24) is inserted in the outlet (4) the cylinder can be refilled to its maximum pressure of 300 bar. The special filling adaptor (24) has a seal (25) which inhibits gas flow from a chamber (28) via a passage (22) to the surrounding atmosphere. This, in turn, inhibits a piston (8) moving downwardly to close the inlet (3) of the pressure reducing valve (1) as would be the case in normal service.

5 Claims, 3 Drawing Sheets 5,033,499

PRESSURE REDUCING VALVE

TECHNICAL FIELD

This invention relates to a pressure reducing valve.

GENERAL BACKGROUND

Industrial gasses are conventionally supplied in cylinders at up to 200 bar. More recently cylinders have been designed which can accommodate gas in excess of 300 bar. Although there are considerable advantages in using the new cylinders many customers do not have pressure regulators capable of handling pressures above 200 bar.

Pressure reducing valves capable of reducing pressure from 300 bar to 200 bar are well known and it would be possible to provide customers with cylinders reducing valve. This would avoid the necessity for the customer to buy new pressure reducing valves. However, the refilling of such cylinders would entail removing the pressure reducing valve, filling the cylinder through the conventional cylinder valve, closing the conventional cylinder valve and refitting the pressure reducing valve. This is a time consuming operation.

BACKGROUND ART

U.S. Pat. No. A3,211,175 discloses a pressure reducing valve having an inlet connectable to a cylinder, an outlet, and means which, when actuated, enable gas to be passed into said outlet and out said inlet at a pressure greater than the outlet pressure of said pressure reducing valve when said pressure reducing valve is in normal service.

The means comprise a tubular body which is slideably mounted in the valve body. When sufficient pressure is applied to the outlet the tubular body is depressed downwardly thereby permitting gas to pass from the outlet to the inlet.

The disadvantages of this arrangement are that it is relatively expensive to produce and requires regular servicing to check the integrity of the seal between the tubular body and the valve body.

DISCLOSURE OF INVENTION

The object of the present invention is to reduce these disadvantages.

According to the present invention there is provided a pressure reducing valve having an inlet connectable to a cylinder, an outlet, and means which, when actuated, enable gas to be passed into said outlet and out said inlet at a pressure greater than the outlet pressure of said pressure reducing valve when said pressure reducing valve is in normal service, wherein said pressure reducing valve comprises a body having a cavity with a piston slideably mounted therein, said piston having a first portion, a second portion and a third portion, said third portion having a diameter greater than said second portion and said second portion, said third portion and said body together defining a chamber, and a passage for permitting gas to flow to and from said chamber, said passage opening into said outlet.

Advantageously, said first portion has a smaller diameter than said second portion.

Preferably, a bore extends from the side of said first portion to the end of said piston at said third portion to transmit pressure from said outlet to the space between said end and said cavity.

The present invention also provides a pressure reducing valve and a filling adaptor which, when inserted in said outlet, inhibits flow of gas to and from said chamber to the surrounding air.

Preferably, on insertion in said outlet said filling adaptor cooperates with said pressure reducing valve so that the pressure in said chamber is substantially equal to the pressure in said outlet.

In an alternative arrangement, on insertion in said outlet said filling adaptor blocks said passage to inhibit gas leaving or entering said chamber.

For a better understanding of the invention reference will now be made, by way of example, to the accompanying drawings, in which.

Figure 1:
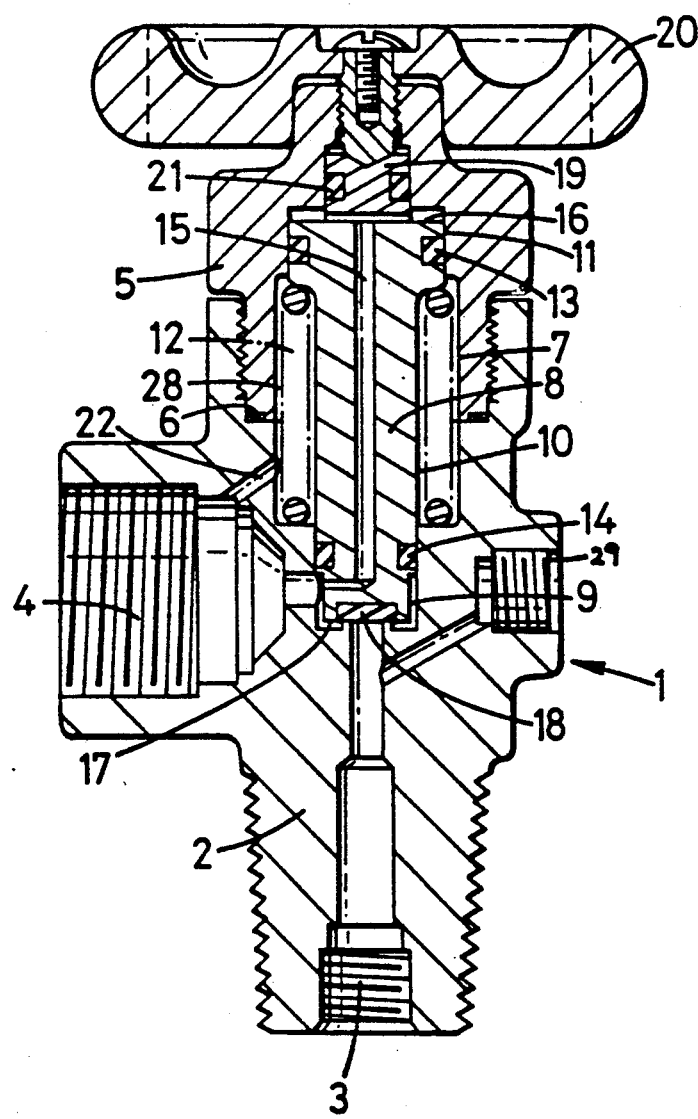
FIG. 1 is a cross-section through one embodiment of a pressure reducing valve in accordance with the invention in its closed position.

Referring to the drawings there is shown a pressure reducing valve which is generally identified by reference numeral 1. The pressure reducing valve 1 comprises a body having a base 2 provided with an inlet 3 and an outlet 4.

The upper part of the body comprises a bonnet 5 which is threadedly connected to the base 2 and bears against a seal 6. The inside of the bonnet 5 and the inside of the upper part of the base 2 together define a cavity 7 which slideably accommodates a piston 8.

The piston 8 comprises three portions, viz a first portion 9 of a first diameter, a second portion 10 of a second diameter which is greater than the first diameter, and a third portion 11 of a third diameter which is greater than the second diameter.

The piston 8 is biased upwardly by a spring 12. Seals 13 and 14 are provided between the third portion of the piston 8 and the bonnet 5 and between the second portion 10 of the piston 8 and the base 2 respectively.

A bore 15 extends from the upper surface 16 of the piston 8 and opens in the side of the first portion 9 of the piston 8.

The lower surface 17 of the piston 8 is provided with a seal 18.

The piston 8 is maintained in the position shown in FIG. 1 by a member 19 which can be raised or lowered by rotating a handwheel 20. A seal 21 is provided which acts between the member 19 and the bonnet 5.

A passage 22 extends between a chamber 28 in the cavity 7 and the outlet 4 and provides the sole means by which gas may enter or exit from the chamber 28 bounded by the two seals 13 and 14.

Figure 2:
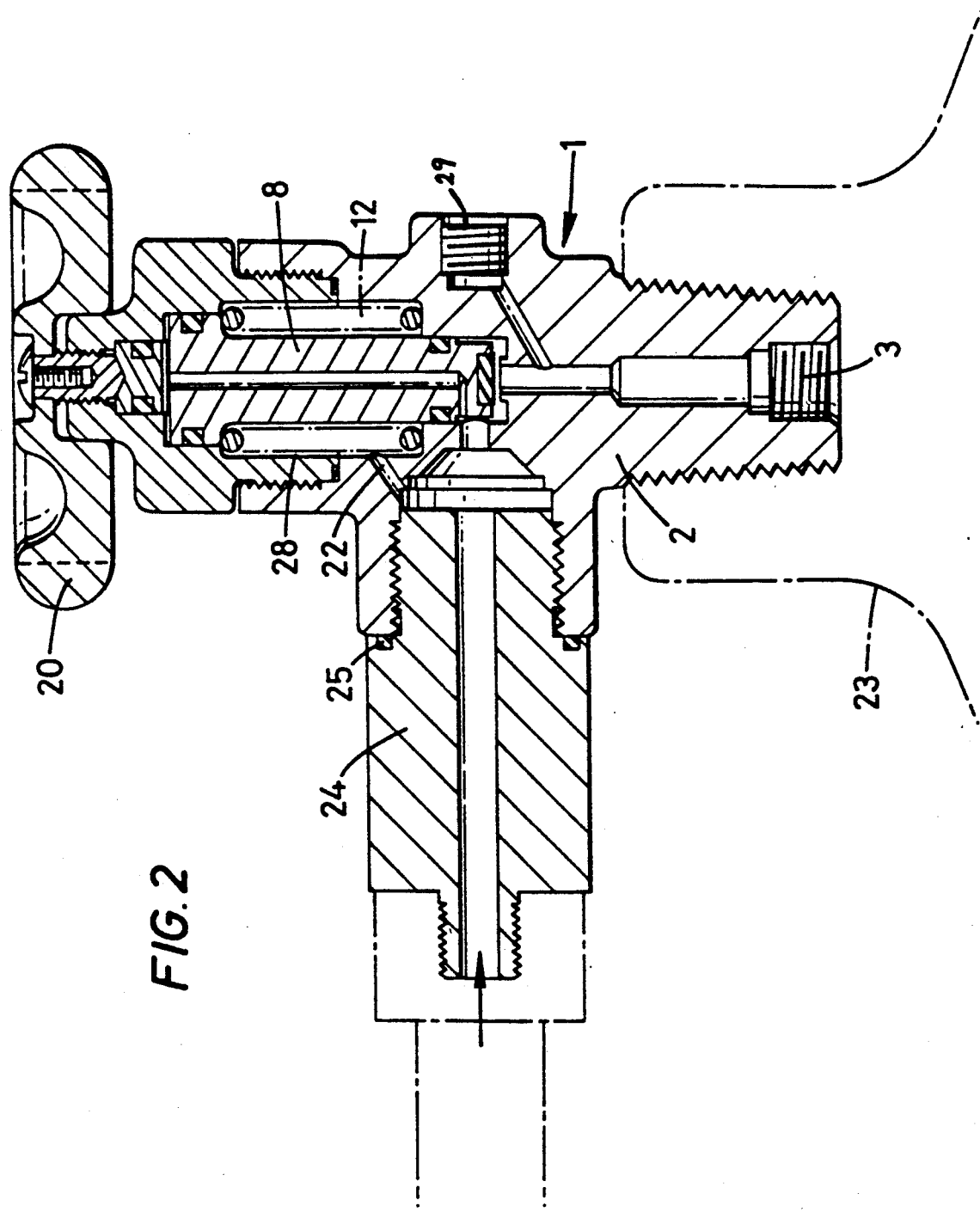
FIG. 2 shows, in cross-section, the pressure reducing valve shown in FIG. 1 provided with a filling adaptor and mounted on a cylinder.

In use, the pressure reducing valve 1 is screwed on to a cylinder 23 (FIG. 2). The cylinder 23 is then stood in a rack and a filling adaptor 24 is screwed into the outlet 4. The filling adaptor 24 differs from a conventional filling adaptor in that it has a sealing ring 25 which prevents gas flowing from the chamber 28 to the surrounding air. Handwheel 20 is then opened and piston 5 rises under the force of spring 12. Gas is then admitted through the filling adaptor 24 until the pressure in the cylinder 23 reaches 300 bars. It will be noted that since the gas in chamber 28 is at the pressure of the gas supply, piston 8 cannot move downwardly and consequently filling can proceed. In particular, the incoming gas acts upwardly on the lower surface 17 of the piston 8 and on the lower surface of the third portion 11 circumjacent the second portion 10. This force is exactly equal to the downward force exerted by the gas on the upper surface 16 of the piston 8. Since the upward force is supplemented by spring 12 the piston 8 remains in its upwardly displaced position.

At the conclusion of the filling operation handwheel 20 is closed and filling adaptor 24 removed.

Figure 3:
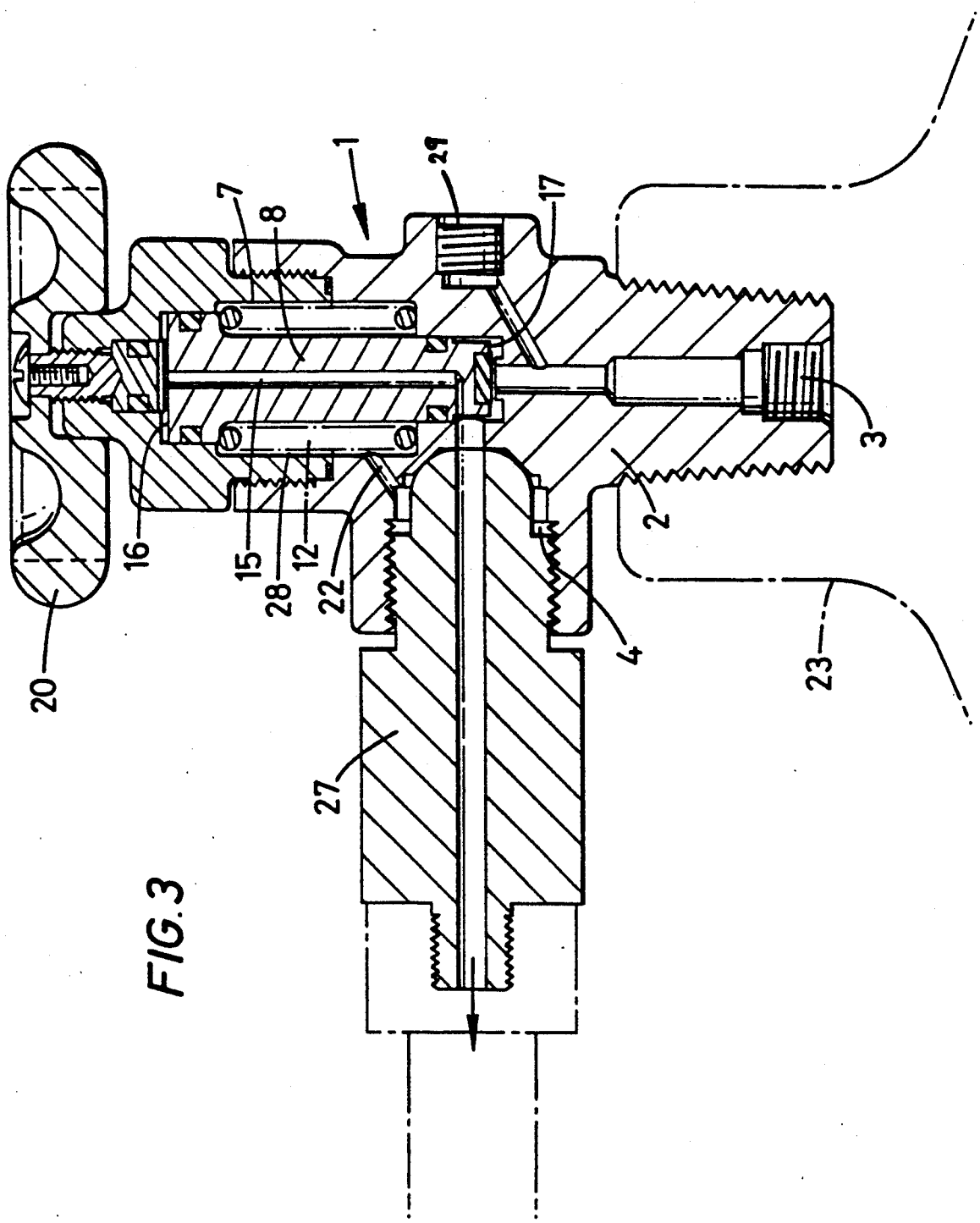
FIG. 3 shows, in cross-section, the pressure reducing valve shown in FIG. 1 provided with a standard adaptor and mounted on a cylinder.

In use, the customer connects his pressure regulator (or appliance) to the outlet 4 using a standard adaptor 27 (FIG. 3). The rounded nose of the standard adaptor 27 seals firmly against the base of the outlet 3. Handwheel 20 is then opened to the position shown in FIG. 3. Gas from the cylinder 23 together with spring 12 raise piston 8 and this allows gas to flow from the cylinder 23 through the inlet 3 and out of the outlet 4. Pressure in the outlet 4 is transmitted via bore 15 to the space between the upper surface 16 of the piston 8 and the top of the cavity 7. When the downward force on the upper surface 16 of the piston 8 exceeds the sum of the upward force on the lower surface 17 of the piston 8 plus the force exerted by the spring 12 the piston 8 moves downwardly closing the inlet 3. It should be noted that when using the standard adaptor 27 gas is free to move to and from the chamber 28, via passage 22, and the threads connecting the standard adaptor 27 to the body 2.

Once empty the cylinder 23 can be refilled by connecting the outlet 4 to a gas supply using an appropriate adaptor.

It will be appreciated that should the spring 12 fail the pressure reducing valve will fail safe.

Typically, pressure reducing valve 1 will be designed to operate with an inlet pressure from 200-300 bar and an outlet pressure of from 50-200 bar. As a precaution, the pressure reducing valve 1 is provided with a bursting disc 29 which is designed to rupture if the pressure in the inlet 3 exceeds a predetermined value.

Various modifications to the design disclosed are envisaged, for example a spring could be placed between the upper surface 16 of the piston 8 and the lower surface of the member 19. Rotation of handwheel 20 would then adjust the output pressure of the pressure reducing valve.

If desired a safety valve could be mounted on the body 2 and arranged to vent should the pressure in the outlet 4 exceed a predetermined value.

If desired, the bore 15 could extend from the outlet 4 to the space above the piston 8 through the base 2 and the bonnet 5.

The spring 12 could conceivably be omitted.

If desired the filling adaptor could be designed to seal either side of the passage 22 and thereby completely isolate the chamber 28.

What is claimed is:

1. A cylinder valve for a high pressure gas storage cylinder adapted to store gas at pressures in excess of 200 bar comprising in combination:

a valve body having a lower portion with an inlet adapted for fluid tight connection to a gas storage cylinder and an outlet adapted for connection selectively to a source of gas to fill said cylinder and a conventional pressure regulator for dispensing said stored gas at a point of use and an upper portion adapted to contain a piston;

a passage in said body communicating with said inlet and said outlet, said passage including a valve seat disposed so as to permit said piston to control flow of said gas between said inlet and said outlet;

the upper portion of said body closed by a bonnet said bonnet adapted to contain said piston in a fluid tight chamber to permit movement toward and away from said inlet; said piston having a first end adapted to close said inlet and a second end adapted to effect movement of said piston by gas pressure exerted thereon, said piston adapted to support one end of and position means to bias said piston away from said inlet, said piston further including a passage to permit said high pressure fluid at all times when said piston is positioned away from said inlet to permit gas to flow through said passage and act upon said second end of said piston;

a passage between said outlet and said chamber containing said piston, whereby when said cylinder is being filled the source pressure of the filling source is introduced into said chamber causing said piston to be maintained in position away from said inlet until the cylinder is filled; and means in said bonnet to move said piston toward and away from said inlet.

2. A pressure reducing valve as claimed in claim 1, wherein said first portion has a smaller diameter than said second portion.

3. A pressure reducing valve as claimed in claim 1, and a filling adaptor which, when inserted in said outlet inhibits flow of gas to and from said chamber to the surrounding air.

4. A pressure reducing valve and a filling adaptor as claimed in claim 3, so shaped that on insertion in said outlet said filling adaptor cooperates with said pressure reducing valve so that the pressure in said chamber is substantially equal to the pressure in said outlet.

5. A pressure reducing valve and a filling adaptor as claimed in claim 3, so shaped that on insertion in said outlet said filling adaptor blocks said passage to inhibit gas leaving or entering said chamber.

* * * * *